United States Patent
Eddy (10) Patent No.: US 6,204,427 B1
(45) Date of Patent: Mar. 20, 2001

(54) PROCESS AND APPARATUS FOR THE PARTITIONING AND THERMAL TREATMENT OF HETEROGENEOUS FEEDSTOCK

(76) Inventor: Thomas L. Eddy, 2398 Hoopes Ave., Idaho Falls, ID (US) 83404

(*) Notice: Subject to any disclaimer, the term of this patent is extended or adjusted under 35 U.S.C. 154(b) by 0 days.

(21) Appl. No.: 08/764,525

(22) Filed: Dec. 12, 1996

Related U.S. Application Data (60) Provisional application No. 60/008,928, filed on Dec. 18, 1995.

(51) Int. Cl.[7] ............................... F23G 5/00; A62D 3/00
(52) U.S. Cl. ...................... 588/200; 588/206; 588/207; 588/213; 588/256; 110/346
(58) Field of Search ................................. 588/200, 206, 588/207, 213, 256; 110/346

(56) References Cited

U.S. PATENT DOCUMENTS

| | | | |
|---|---|---|---|
| 4,421,037 | 12/1983 | Leam | 110/238 |
| 5,052,312 | 10/1991 | Rackley et al. | 110/346 |
| 5,424,042 | * 6/1995 | Mason et al. | 422/159 |
| 5,541,386 | 7/1996 | Alvi et al. | 588/900 |
| 5,548,611 | * 8/1996 | Cusick et al. | 373/18 |
| 5,662,579 | * 9/1997 | Bickford | 588/256 |
| 5,666,891 | * 9/1997 | Titus et al. | 110/250 |

OTHER PUBLICATIONS

Advanced Mixed Waste Treatment Project Melter System Preliminary Design Technical Review Meeting: Eddy, et al., Pertinent pp. 5–20, 5–24, 5–25, 6–9, 6–16, 6–20, 7–4 and 8–1 to 8–18.

* cited by examiner

*Primary Examiner*—Daniel J. Jenkins
(74) *Attorney, Agent, or Firm*—Morrison & Foerster, LLP (57) ABSTRACT

A novel process and apparatus for the thermal partitioning of heterogeneous feedstock for the production of a metal product, a glass ceramic product and a gaseous product. The process includes the capability for thermal treatment of hazardous waste as defined by the Environmental Protection Agency (EPA) which also contains radioactive isotopes in some cases (mixed waste as defined by the Department of Energy) and the production of stable long-lived products as a result of treatment. More specifically, this invention relates to a novel process and apparatus whereby an input feed stream of a widely heterogeneous nature in the descriptors of physical form, combustibility, chemical content, and particle size and contaminated with varying concentrations of hazardous components and/or radioisotopes is treated in a direct current graphite electrode arc melter with a contiguous thermal oxidizing reactor for the production of a metal product, a basalt-like glass ceramic product and a fully combusted offgas. The apparatus described incorporates an offgas fast quench configuration for the minimization of dioxin formation and subsequent ease of cleansing of the offgas stream.

33 Claims, 4 Drawing Sheets

PROCESS AND APPARATUS FOR THE PARTITIONING AND THERMAL TREATMENT OF HETEROGENEOUS FEEDSTOCK

This application claims the benefit of U.S. provisional application No. 60/008928, filed Dec. 18, 1995.

FIELD OF THE INVENTION

The present invention pertains generally to the thermal processing of heterogeneous feedstock and the production of a metal product, a glass ceramic product and a gaseous product. The process includes the capability for thermal treatment of hazardous waste as defined by the Environmental Protection Agency (EPA) which also contains radioactive isotopes in some cases (mixed waste as defined by the Department of Energy) and the production of stable long lived products as a result of treatment. More specifically, this invention relates to a novel process and apparatus whereby an input feed stream of a widely heterogeneous nature in the descriptors of physical form, combustibility, chemical content, and particle size, and contaminated with varying concentrations of hazardous components or radiosotopes is treated in a direct or alternating current graphite electrode arc melter with a contiguous thermal oxidizing reactor for the production of a metal product, a basalt like glass ceramic product and a fully combusted offgas. The apparatus described incorporates an offgas fast quench configuration for the minimization of dioxin formation and for subsequent ease of cleansing of the offgas stream.

BACKGROUND OF THE INVENTION

Joule heated melters have traditionally been used for the production of glass-based products. Graphite electrode arc melters have traditionally been used for the reduction of ores to metals and for the production of value added products from a controlled and well defined input feed steam. Arc melters have also been used for the production of a value added mineral wool product from a well characterized and controlled input feedstock. Plasma arc torch melters have traditionally been used for the production of higher value precious metals such as titanium. The various types of melters commonly used in industry can be classified as low temperature (900° C.–1,200° C.) medium temperature (1,200° C.–1,500° C.) and high temperature (1,500° C.–2,000° C.), with their use defined by the product desired and process required. The joule heated melters commonly used for the production of glass (including borosilicate glass for high level radioactive waste) fall into the low temperature range. Medium temperature melters are required for the production of higher temperature glasses such as aluminosilicate glasses and glass ceramics.

High temperature melters are required for the reduction of ores to metals such as iron ore to iron and for the production of a basalt-like glass ceramic product without the addition of fluxing agents to lower the viscosity. Arc melters use heat generated when an electric arc passes through a gas. The gas is ionized and forms a very high temperature plasma. The plasma temperatures can exceed many thousands of degrees centigrade. The high temperatures enable rapid and intense heating of process materials, making this technology ideal for high temperature metals processing.

Current research and development by government and industry is being pursued for the purpose of applying arc melter technology to the treatment of hazardous and/or radioactive wastes. The application of traditional melter technology and equipment to the safe, efficient and economical treatment of heterogeneous hazardous and/or radioactive waste involves the expansion of the allowable makeup of the input feed stream, the expansion of the flexibility of process operation, and the tightening of specifications for the output products and offgases.

There have been a number of testing or development programs to apply electric arc melter technology to the treatment of radioactive wastes, mixed wastes, municipal wastes, and hazardous wastes. In an arc melter, waste materials are heated to (a) volatilize, pyrolyze, and destroy organics, and (b) melt inorganic materials into molten slag or metal phases. By controlling reaction stoichiometry, mixing, and other operating parameters, the process can be used to chemically oxidize or reduce waste components, or react waste components to form new products.

Leam In U.S. Pat. No. 4,421,037 discusses a waste treatment furnace.

Rackley, et al. In U.S. Pat. No. 5,052,312 discusses a cyclone furnace for hazardous waste incineration and ash vitrification.

Alvi, et al. In U.S. Pat. No. 5,541,386 discusses the plasma arc decomposition of hazardous waste into vitrified solids and non-hazardous gasses.

SUMMARY OF THE INVENTION

The described process and apparatus enables the continuous or intermittent feeding of widely varying heterogeneous input waste streams, the thermal partitioning of the input feed into inert and volatile fractions, the melting and oxidation or reduction of the inert fraction into a glass ceramic (slag) phase consisting of oxidized metals and low vapor pressure materials, the melting and reduction of the inert fraction metals into a metal phase, and the complete combustion and oxidation of the vapor phase. Further, the flexibility of the operation and process enables control of the volatilization of higher vapor pressure materials and forces positioning of these materials to the glass ceramic phase.

The process and apparatus provides for the removal of the metal and glass ceramic phases by high temperature tapping techniques and fast cooling of the offgas from greater than 2000° F. to less than 150° F. in a minimum time period. Further, the process provides for the reclamation of a glass ceramic product via product casting techniques and controlled cooling via insulation or heat addition to control the crystalline phase structure of the final cooled product.

The types of wastes applicable to treatment in the described invention include wastes having widely varying compositions in terms of soil content, metal content, combustible content, organic content and hazardous contaminant content.

The glass ceramic product produced exceeds the current requirements for Toxic Characteristic Leach Procedure (TCLP) as published in the Federal Register on Mar. 29, 1989, and can meet a more narrowly defined product specification suitable for reclamation. This specification may include narrowly defined compositional ranges and physical properties.

The metal product is also suitable for reclamation as industrial scrap metal from non-radioactive input feed and as recyclable metal within the nuclear industry from radioactive contaminated input feedstock.

The offgas is fast quenched from temperatures required for complete combustion and oxidation (>2,000° F.) in minimal time to below the temperatures accepted as the formation temperature for dioxins and furans, thereby minimizing the production of dioxins. Further offgas cleansing enables the partitioning of the offgas particulates to volatile metals fractions and salts.

BRIEF DESCRIPTION OF THE ACCOMPANYING DRAWINGS

Reference will herein be made to the accompanying drawings wherein like reference numerals throughout these various FIGURES denote like elements, and wherein.

The invention and its various embodiments are described in more detail in the following description.

DETAILED DESCRIPTION OF THE PRESENT INVENTION

The present invention can process a wide variety of municipal, hazardous, radioactive, and mixed (both radioactive and hazardous) wastes. Testing conducted on the present invention design in this patent application has shown that the present invention can process a range of feedstock shown in Table 1. The chemical makeup of many of these components and similar components are shown in Table 2, 3 and 4.

TABLE 1

Acceptable limits of input feedstock variations.

| Feedstock component | Weight % |
|---|---|
| Soils | 0–100 |
| Metals | 0–35 |
| Combustibles | 0–90 |
| Volatile organics | 0–60 |
| Chlorinated organics | 0–60 |
| Chlorine | 0–20 |
| Carbon | 0–40 |
| Nitrates | 0–20 |
| Hydroxides | 0–100 |

TABLE 2

Typical chemical composition of feedstock material treatable by this invention.

| Constituent | Wt % of waste constituent | | | | | | | | |
|---|---|---|---|---|---|---|---|---|---|
| | Carbon | Hydrogen | Oxygen | Nitrogen | Sulfur | Chlorine | Fluorine | Water | Inert |
| Noncombustible Glass | | | | | | | | | |
| Glass Raschig rings | 0.00 | 0.00 | 0.00 | 0.00 | 0.00 | 0.00 | 0.00 | 0.00 | 100.00 |
| Other glass | 0.00 | 0.00 | 0.00 | 0.00 | 0.00 | 0.00 | 0.00 | 0.00 | 100.00 |
| Metals | | | | | | | | | |
| Carbon steel | 0.00 | 0.00 | 0.00 | 0.00 | 0.00 | 0.00 | 0.00 | 0.00 | 100.00 |
| Stainless steel | 0.00 | 0.00 | 0.00 | 0.00 | 0.00 | 0.00 | 0.00 | 0.00 | 100.00 |
| Aluminum | 0.00 | 0.00 | 0.00 | 0.00 | 0.00 | 0.00 | 0.00 | 0.00 | 100.00 |
| Tantalum 10W | 0.00 | 0.00 | 0.00 | 0.00 | 0.00 | 0.00 | 0.00 | 0.00 | 100.00 |
| Miscellaneous metal | 0.00 | 0.00 | 0.00 | 0.00 | 0.00 | 0.00 | 0.00 | 0.00 | 100.00 |
| Lead | 0.00 | 0.00 | 0.00 | 0.00 | 0.00 | 0.00 | 0.00 | 0.00 | 100.00 |
| HVPM (Zn, Cd) | 0.00 | 0.00 | 0.00 | 0.00 | 0.00 | 0.00 | 0.00 | 0.00 | 100.00 |
| Miscellaneous Noncombustible | | | | | | | | | |
| Ceramic molds | 0.00 | 0.00 | 0.00 | 0.00 | 0.00 | 0.00 | 0.00 | 0.00 | 100.00 |
| Firebrick | 0.00 | 0.00 | 0.00 | 0.00 | 0.00 | 0.00 | 0.00 | 3.00 | 97.00 |
| Concrete | 0.00 | 0.00 | 0.00 | 0.00 | 0.00 | 0.00 | 0.00 | 8.72 | 91.28 |
| Portland cement | 0.00 | 0.00 | 0.00 | 0.00 | 0.00 | 0.00 | 0.00 | 5.00 | 95.00 |
| Dirt/soil | 0.00 | 0.00 | 0.00 | 0.00 | 0.00 | 0.00 | 0.00 | 10.00 | 90.00 |
| Ash | 0.00 | 0.00 | 0.00 | 0.00 | 0.00 | 0.00 | 0.00 | 0.00 | 100.00 |
| Oil-Dri | 0.00 | 0.00 | 0.00 | 0.00 | 0.00 | 0.00 | 0.00 | 5.00 | 95.00 |
| Venniculite | 0.00 | 0.00 | 0.00 | 0.00 | 0.00 | 0.00 | 0.00 | 5.00 | 95.00 |
| Evap. salts | 0.85 | 0.13 | 0.00 | 0.00 | 0.00 | 0.00 | 0.00 | 0.13 | 98.88 |
| Filters/Insulation | | | | | | | | | |
| Glass filter media | 3.96 | 0.54 | 0.00 | 0.00 | 0.00 | 0.00 | 0.00 | 5.00 | 90.50 |
| Asbestos filter media | 3.96 | 0.54 | 0.00 | 0.00 | 0.00 | 0.00 | 0.00 | 5.00 | 90.50 |
| Filter dust | 0.00 | 0.00 | 0.00 | 0.00 | 0.00 | 0.00 | 0.00 | 10.00 | 90.00 |
| Magnesia (insulation) | 0.00 | 0.00 | 0.00 | 0.00 | 0.00 | 0.00 | 0.00 | 2.00 | 98.00 |
| Inorganic Sludge | | | | | | | | | |
| Sludge-high $Na_2O$ | 0.00 | 0.00 | 0.00 | 0.00 | 0.00 | 0.00 | 0.00 | 60.00 | 40.00 |
| Sludge-high CaO | 0.00 | 0.00 | 0.00 | 0.00 | 0.00 | 0.00 | 0.00 | 60.00 | 40.00 |
| Aqueous solutions | 0.00 | 0.00 | 0.00 | 0.00 | 0.00 | 0.00 | 0.00 | 100.00 | 0.0 |

TABLE 2-continued

Typical chemical composition of feedstock material treatable by this invention.

| | Wt % of waste constituent | | | | | | | | |
|---|---|---|---|---|---|---|---|---|---|
| Constituent | Carbon | Hydrogen | Oxygen | Nitrogen | Sulfur | Chlorine | Fluorine | Water | Inert |
| Partially Combustible | | | | | | | | | |
| Leaded rubber | 33.16 | 4.47 | 1.01 | 0.28 | 0.51 | 0.00 | 0.00 | 0.00 | 60.56 |
| Organic sludge | 26.69 | 3.65 | 0.00 | 0.00 | 0.00 | 39.69 | 0.00 | 0.00 | 29.97 |
| Uncemented resin | 83.03 | 6.97 | 0.00 | 0.00 | 0.00 | 0.00 | 0.00 | 10.00 | 0.00 |
| Cemented resins | 27.68 | 2.32 | 0.00 | 0.00 | 0.00 | 0.00 | 0.00 | 20.00 | 50.00 |
| Asphalt | 4.294 | 0.49 | 0.05 | 0.05 | 0.12 | 0.00 | 0.00 | 0.00 | 95.01 |
| Benelex/lead | 33.20 | 3.53 | 25.19 | 0.00 | 0.03 | 0.00 | 0.00 | 3.35 | 34.70 |
| Sheetrock | 0.41 | 0.06 | 0.42 | 0.00 | 0.00 | 0.00 | 0.00 | 20.77 | 78.34 |
| Combustibles Plastics | | | | | | | | | |
| Poly | 84.93 | 13.40 | 0.35 | 0.11 | 0.02 | 0.00 | 0.00 | 0.00 | 1.19 |
| PVC | 47.38 | 5.73 | 9.09 | 0.00 | 0.01 | 35.72 | 0.00 | 0.00 | 2.07 |
| Teflon | 24.00 | 0.00 | 0.00 | 0.00 | 0.00 | 0.00 | 76.00 | 0.00 | 0.00 |
| Plexiglas | 59.99 | 8.05 | 31.96 | 0.00 | 0.00 | 0.00 | 0.00 | 0.00 | 0.00 |
| Rubber | 76.23 | 10.28 | 2.32 | 0.65 | 1.18 | 0.00 | 0.00 | 0.00 | 9.34 |
| Surgeon's glove | 76.23 | 10.28 | 2.32 | 0.65 | 1.18 | 0.00 | 0.00 | 0.00 | 9.34 |
| Miscellaneous Combustibles | | | | | | | | | |
| Graphite | 99.19 | 0.70 | 0.00 | 0.00 | 0.01 | 0.00 | 0.00 | 0.00 | 0.10 |
| Paper | 49.54 | 5.27 | 37.59 | 0.00 | 0.05 | 0.00 | 0.00 | 5.00 | 2.55 |
| Wood | 46.94 | 5.00 | 35.61 | 0.00 | 0.05 | 0.00 | 0.00 | 10.00 | 2.42 |
| Cardboard | 49.54 | 5.27 | 37.59 | 0.00 | 0.05 | 0.00 | 0.00 | 5.00 | 2.55 |
| Cloth | 49.54 | 5.27 | 37.59 | 0.00 | 0.05 | 0.00 | 0.00 | 5.00 | 2.55 |

TABLE 3

Chemical composition of the inert fraction of feedstock material treatable by this invention expressed as a fraction of the inert chemicals.

| Constituent | Aluminum | Boron | Barium | Calcium | CaSO4 | Cadmium | Carbon | Chromium | Copper | Gallium | Iron | Lead | Magnesium | Manganese |
|---|---|---|---|---|---|---|---|---|---|---|---|---|---|---|
| Noncombustible Glass | | | | | | | | | | | | | | |
| Glass Raschig rings | 0.00 | 12.80 | 0.00 | 5.00 | 0.00 | 0.00 | 0.00 | 0.00 | 0.00 | 0.00 | 0.00 | 0.00 | 0.00 | 0.00 |
| Other glass | 0.00 | 5.00 | 0.00 | 5.00 | 0.00 | 0.00 | 0.00 | 0.00 | 0.00 | 0.00 | 0.00 | 0.00 | 0.00 | 0.00 |
| Metals | | | | | | | | | | | | | | |
| Carbon steel | 0.00 | 0.00 | 0.00 | 0.00 | 0.00 | 0.00 | 0.20 | 0.00 | 0.00 | 0.00 | 99.10 | 0.00 | 0.00 | 0.45 |
| Stainless steel | 0.00 | 0.00 | 0.00 | 0.00 | 0.00 | 0.00 | 0.03 | 19.00 | 0.00 | 0.00 | 71.97 | 0.00 | 0.00 | 0.00 |
| Aluminum | 98.90 | 0.00 | 0.00 | 0.00 | 0.00 | 0.00 | 0.00 | 0.00 | 0.00 | 0.00 | 0.00 | 0.00 | 0.70 | 0.00 |
| Tantalum 10W | 0.00 | 0.00 | 0.00 | 0.00 | 0.00 | 0.00 | 0.00 | 0.00 | 0.00 | 0.00 | 0.00 | 0.00 | 0.00 | 0.00 |
| Miscellaneous metal | 30.00 | 0.00 | 0.00 | 0.00 | 0.00 | 1.00 | 0.00 | 1.00 | 10.00 | 0.00 | 50.00 | 1.00 | 2.00 | 0.00 |
| Lead | 0.00 | 0.00 | 0.00 | 0.00 | 0.00 | 0.00 | 0.00 | 0.00 | 0.10 | 0.00 | 0.00 | 99.90 | 0.00 | 0.00 |
| HVPM (Zn, Cd) | 0.00 | 0.00 | 0.00 | 0.00 | 0.00 | 50.00 | 0.00 | 0.00 | 0.00 | 0.00 | 0.00 | 0.00 | 0.00 | 0.00 |
| Miscellaneous Noncombustible | | | | | | | | | | | | | | |
| Ceramic molds | 0.00 | 0.00 | 0.00 | 0.00 | 0.00 | 0.00 | 0.00 | 0.00 | 0.00 | 0.00 | 0.00 | 0.00 | 61.64 | 0.00 |
| Firebrick | 43.00 | 0.00 | 0.00 | 1.00 | 0.00 | 0.00 | 0.00 | 0.00 | 0.00 | 0.00 | 1.00 | 0.00 | 1.00 | 0.00 |
| Concrete | 1.08 | 0.00 | 0.00 | 9.79 | 0.00 | 0.00 | 0.00 | 0.00 | 0.00 | 0.00 | 0.45 | 0.00 | 0.40 | 0.00 |
| Portland cement | 6.91 | 0.00 | 0.00 | 62.92 | 0.00 | 0.00 | 0.00 | 0.00 | 0.00 | 0.00 | 2.91 | 0.00 | 2.54 | 0.00 |
| Dirt/soil | 12.70 | 0.00 | 0.00 | 3.70 | 0.00 | 0.00 | 0.00 | 0.00 | 0.00 | 0.00 | 5.10 | 0.00 | 2.90 | 0.00 |
| Ash | 15.22 | 0.00 | 0.12 | 7.74 | 0.00 | 0.51 | 0.00 | 1.84 | 1.70 | 0.00 | 28.30 | 7.81 | 5.37 | 0.15 |
| Oil-Dri | 26.86 | 0.00 | 0.00 | 2.35 | 0.00 | 0.00 | 0.00 | 0.00 | 0.00 | 0.00 | 4.34 | 0.00 | 5.02 | 0.00 |
| Venniculite | 19.95 | 0.00 | 0.00 | 0.00 | 0.00 | 0.00 | 0.00 | 0.00 | 0.00 | 0.00 | 41.30 | 0.00 | 17.98 | 0.00 |
| Evap. salts | 1.93 | 0.00 | 0.00 | 2.47 | 0.00 | 0.00 | 0.00 | 0.00 | 0.00 | 0.00 | 0.66 | 0.00 | 0.45 | 0.00 |
| Filters/Insulation | | | | | | | | | | | | | | |
| Glass filter media | 6.28 | 10.47 | 4.19 | 3.14 | 0.00 | 0.00 | 0.00 | 0.00 | 0.00 | 0.00 | 0.10 | 0.00 | 1.05 | 0.00 |
| Asbestos filter media | 0.00 | 0.00 | 0.00 | 0.00 | 0.00 | 0.00 | 0.00 | 0.00 | 0.00 | 0.00 | 0.00 | 0.00 | 21.16 | 0.00 |
| Filter dust | 12.70 | 0.00 | 0.00 | 3.70 | 0.00 | 0.00 | 0.00 | 0.00 | 0.00 | 0.00 | 5.10 | 0.00 | 2.90 | 0.00 |
| Magnesia (insulation) | 0.00 | 0.00 | 0.00 | 0.00 | 0.00 | 0.00 | 0.00 | 0.00 | 0.00 | 0.00 | 0.00 | 0.00 | 100.00 | 0.00 |
| Inorganic Sludge | | | | | | | | | | | | | | |
| Sludge-high Na$_2$O | 8.34 | 0.00 | 0.00 | 4.80 | 0.00 | 0.00 | 0.00 | 0.10 | 0.17 | 5.51 | 6.52 | 0.64 | 5.20 | 0.00 |
| Sludge-high CaO | 4.31 | 0.00 | 0.00 | 22.61 | 0.00 | 0.00 | 0.00 | 0.04 | 0.18 | 0.08 | 5.84 | 0.31 | 10.55 | 0.00 |
| Aqueous solutions | 0.00 | 0.00 | 0.00 | 0.00 | 0.00 | 0.00 | 0.00 | 0.00 | 0.00 | 0.00 | 0.00 | 0.00 | 0.00 | 0.00 |

TABLE 3-continued

Chemical composition of the inert fraction of feedstock material treatable by this invention expressed as a fraction of the inert chemicals.

Partially Combustible

| | | | | | | | | | | | | | | |
|---|---|---|---|---|---|---|---|---|---|---|---|---|---|---|
| Leaded rubber | 0.07 | 0.00 | 0.00 | 1.39 | 0.00 | 0.00 | 0.00 | 0.00 | 0.09 | 0.00 | 0.07 | 96.20 | 0.42 | 0.00 |
| Organic sludge | 0.00 | 0.00 | 0.00 | 37.89 | 0.00 | 0.00 | 0.00 | 0.00 | 0.00 | 0.00 | 7.40 | 0.00 | 0.14 | 0.00 |
| Uncemented resin | 0.00 | 0.00 | 0.00 | 0.00 | 0.00 | 0.00 | 0.00 | 0.00 | 0.00 | 0.00 | 0.00 | 0.00 | 0.00 | 0.00 |
| Cemented resins | 6.91 | 0.00 | 0.00 | 64.00 | 0.00 | 0.00 | 0.00 | 0.00 | 0.00 | 0.00 | 2.91 | 0.00 | 2.54 | 0.00 |
| Asphalt | 0.13 | 0.00 | 0.00 | 0.20 | 0.00 | 0.00 | 0.00 | 0.00 | 0.00 | 0.00 | 0.69 | 0.00 | 0.17 | 0.00 |
| Benelex/lead | 0.31 | 0.00 | 0.00 | 1.56 | 0.00 | 0.00 | 0.00 | 0.00 | 0.00 | 0.00 | 0.23 | 95.08 | 0.24 | 0.09 |
| Sheetrock | 0.06 | 0.00 | 0.00 | 0.31 | 99.00 | 0.00 | 0.00 | 0.00 | 0.00 | 0.00 | 0.04 | 0.00 | 0.05 | 0.02 |

Combustibles
Plastics

| | | | | | | | | | | | | | | |
|---|---|---|---|---|---|---|---|---|---|---|---|---|---|---|
| Poly | 0.10 | 0.00 | 0.00 | 99.70 | 0.00 | 0.00 | 0.00 | 0.00 | 0.00 | 0.00 | 0.00 | 0.00 | 0.20 | 0.00 |
| PVC | 0.20 | 0.00 | 22.16 | 0.90 | 0.00 | 61.94 | 0.00 | 0.00 | 0.00 | 0.00 | 0.20 | 0.00 | 0.40 | 0.80 |
| Teflon | 0.00 | 0.00 | 0.00 | 0.00 | 0.00 | 0.00 | 0.00 | 0.00 | 0.00 | 0.00 | 0.00 | 0.00 | 0.00 | 0.00 |
| Plexiglas | 0.00 | 0.00 | 0.00 | 0.00 | 0.00 | 0.00 | 0.00 | 0.00 | 0.00 | 0.00 | 0.00 | 0.00 | 0.00 | 0.00 |

Rubber

| | | | | | | | | | | | | | | |
|---|---|---|---|---|---|---|---|---|---|---|---|---|---|---|
| Rubber | 1.00 | 0.00 | 0.00 | 20.70 | 0.00 | 0.00 | 0.00 | 0.00 | 0.00 | 0.00 | 1.00 | 0.10 | 6.20 | 0.00 |
| Surgeon's glove | 1.00 | 0.00 | 0.00 | 20.70 | 0.00 | 0.00 | 0.00 | 0.00 | 0.00 | 0.00 | 1.00 | 0.10 | 6.20 | 0.00 |

Miscellaneous Combustibles

| | | | | | | | | | | | | | | |
|---|---|---|---|---|---|---|---|---|---|---|---|---|---|---|
| Graphite | 15.00 | 0.00 | 0.00 | 7.10 | 0.00 | 0.00 | 0.00 | 0.00 | 0.00 | 0.00 | 17.30 | 0.00 | 2.30 | 0.00 |
| Paper | 6.31 | 0.00 | 0.00 | 31.79 | 0.00 | 0.00 | 0.00 | 0.00 | 0.00 | 0.00 | 4.58 | 0.00 | 4.97 | 1.84 |
| Wood | 6.31 | 0.00 | 0.00 | 31.79 | 0.00 | 0.00 | 0.00 | 0.00 | 0.00 | 0.00 | 4.58 | 0.00 | 4.97 | 1.84 |
| Cardboard | 6.31 | 0.00 | 0.00 | 31.79 | 0.00 | 0.00 | 0.00 | 0.00 | 0.00 | 0.00 | 4.58 | 0.00 | 4.97 | 1.84 |
| Cloth | 6.31 | 0.00 | 0.00 | 31.79 | 0.00 | 0.00 | 0.00 | 0.00 | 0.00 | 0.00 | 4.58 | 0.00 | 4.97 | 1.84 |

| Constituent | Nickel | Phosphorous | Potassium | KNO3 | Silicon | Sodium | NaNO3 | Tantalum | Tin | Titanium | Tungsten | Vanadium | Zinc | SO3 | CO2 | Cl |
|---|---|---|---|---|---|---|---|---|---|---|---|---|---|---|---|---|

Noncombustible
Glass

| | | | | | | | | | | | | | | | | |
|---|---|---|---|---|---|---|---|---|---|---|---|---|---|---|---|---|
| Glass Raschig rings | 0.00 | 0.00 | 0.00 | 0.00 | 62.20 | 20.00 | 0.00 | 0.00 | 0.00 | 0.00 | 0.00 | 0.00 | 0.00 | 0.00 | 0.00 | 0.00 |
| Other glass | 0.00 | 0.00 | 0.00 | 0.00 | 70.00 | 20.00 | 0.00 | 0.00 | 0.00 | 0.00 | 0.00 | 0.00 | 0.00 | 0.00 | 0.00 | 0.00 |

Metals

| | | | | | | | | | | | | | | | | |
|---|---|---|---|---|---|---|---|---|---|---|---|---|---|---|---|---|
| Carbon steel | 0.00 | 0.00 | 0.00 | 0.00 | 0.25 | 0.00 | 0.00 | 0.00 | 0.00 | 0.00 | 0.00 | 0.00 | 0.00 | 0.00 | 0.00 | 0.00 |
| Stainless steel | 9.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Aluminum | 0.00 | 0.00 | 0.00 | 0.00 | 0.40 | 0.00 | 0.00 | 0.00 | 0.00 | 0.00 | 0.00 | 0.00 | 0.00 | 0.00 | 0.00 | 0.00 |
| Tantalum 10W | 0.00 | 0.00 | 0.00 | 0.00 | 0.00 | 0.00 | 0.00 | 90.00 | 0.00 | 0.00 | 10.00 | 0.00 | 0.00 | 0.00 | 0.00 | 0.00 |
| Misc. metal | 2.00 | 0.00 | 0.00 | 0.00 | 0.00 | 0.00 | 0.00 | 0.00 | 1.00 | 0.00 | 0.00 | 0.00 | 2.00 | 0.00 | 0.00 | 0.00 |
| Lead | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| HVPM (Zn, Cd) | 0.00 | 0.00 | 0.00 | 0.00 | 0.00 | 0.00 | 0.00 | 0.00 | 0.00 | 0.00 | 0.00 | 0.00 | 50.00 | 0.00 | 0.00 | 0.00 |

Misc.
Noncombustible

| | | | | | | | | | | | | | | | | |
|---|---|---|---|---|---|---|---|---|---|---|---|---|---|---|---|---|
| Ceramic molds | 0.00 | 0.00 | 0.00 | 0.00 | 38.36 | 0.00 | 0.00 | 0.00 | 0.00 | 0.00 | 0.00 | 0.00 | 0.00 | 0.00 | 0.00 | 0.00 |
| Firebrick | 0.00 | 0.00 | 0.00 | 0.00 | 52.00 | 0.00 | 0.00 | 0.00 | 0.00 | 2.00 | 0.00 | 0.00 | 0.00 | 0.00 | 0.00 | 0.00 |
| Concrete | 0.00 | 0.00 | 0.00 | 0.00 | 87.85 | 0.00 | 0.00 | 0.00 | 0.00 | 0.00 | 0.00 | 0.00 | 0.00 | 0.27 | 0.17 | 0.00 |
| Portland cement | 0.00 | 0.00 | 0.00 | 0.00 | 21.92 | 0.00 | 0.00 | 0.00 | 0.00 | 0.00 | 0.00 | 0.00 | 0.00 | 1.72 | 1.08 | 0.00 |
| Dirt/soil | 0.00 | 0.00 | 3.10 | 0.00 | 70.70 | 1.80 | 0.00 | 0.00 | 0.00 | 0.00 | 0.00 | 0.00 | 0.00 | 0.00 | 0.00 | 0.00 |
| Ash | 0.13 | 0.10 | 0.38 | 0.04 | 23.13 | 1.33 | 0.08 | 0.00 | 0.17 | 0.18 | 0.00 | 0.00 | 3.58 | 0.33 | 0.79 | 0.01 |
| Oil-Dri | 0.00 | 0.00 | 0.50 | 0.00 | 60.68 | 0.00 | 0.00 | 0.00 | 0.00 | 0.25 | 0.00 | 0.00 | 0.00 | 0.00 | 0.00 | 0.00 |
| Venniculite | 0.00 | 0.00 | 0.00 | 0.00 | 20.77 | 0.00 | 0.00 | 0.00 | 0.00 | 0.00 | 0.00 | 0.00 | 0.00 | 0.00 | 0.00 | 0.00 |
| Evap. salts | 0.00 | 0.00 | 0.30 | 28.49 | 8.54 | 0.17 | 56.99 | 0.00 | 0.00 | 0.00 | 0.00 | 0.00 | 0.00 | 0.00 | 0.00 | 0.00 |

Filters/Insulation

| | | | | | | | | | | | | | | | | |
|---|---|---|---|---|---|---|---|---|---|---|---|---|---|---|---|---|
| Glass filter media | 0.00 | 0.00 | 2.09 | 0.00 | 59.32 | 10.99 | 0.00 | 0.00 | 0.00 | 0.00 | 0.00 | 0.00 | 2.36 | 0.00 | 0.00 | 0.00 |
| Asbestos filter media | 0.00 | 0.00 | 0.00 | 0.00 | 78.84 | 0.00 | 0.00 | 0.00 | 0.00 | 0.00 | 0.00 | 0.00 | 0.00 | 0.00 | 0.00 | 0.00 |
| Filter dust | 0.00 | 0.00 | 3.10 | 0.00 | 70.70 | 1.80 | 0.00 | 0.00 | 0.00 | 0.00 | 0.00 | 0.00 | 0.00 | 0.00 | 0.00 | 0.00 |
| Magnesia (insulation) | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

Inorganic Sludge

| | | | | | | | | | | | | | | | | |
|---|---|---|---|---|---|---|---|---|---|---|---|---|---|---|---|---|
| Sludge-high Na2O | 0.00 | 0.00 | 4.46 | 0.00 | 36.09 | 28.14 | 0.00 | 0.00 | 0.00 | 0.02 | 0.00 | 0.00 | 0.01 | 0.00 | 0.00 | 0.00 |
| Sludge-high CaO | 0.00 | 0.00 | 3.74 | 0.00 | 46.32 | 5.59 | 0.00 | 0.00 | 0.00 | 0.42 | 0.00 | 0.00 | 0.01 | 0.00 | 0.00 | 0.00 |
| Aqueous solutions | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

Partially Combustible

| | | | | | | | | | | | | | | | | |
|---|---|---|---|---|---|---|---|---|---|---|---|---|---|---|---|---|
| Leaded rubber | 0.00 | 0.09 | 0.00 | 0.00 | 0.28 | 0.09 | 0.00 | 0.00 | 0.00 | 0.14 | 0.00 | 0.00 | 4.17 | 0.00 | 0.00 | 0.00 |
| Organic sludge | 0.00 | 0.00 | 0.56 | 0.00 | 53.95 | 0.00 | 0.00 | 0.00 | 0.00 | 0.06 | 0.00 | 0.00 | 0.00 | 0.00 | 0.00 | 0.00 |
| Uncemented resin | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Cemented resins | 0.00 | 0.00 | 0.00 | 0.00 | 21.92 | 0.00 | 0.00 | 0.00 | 0.00 | 0.00 | 0.00 | 0.00 | 0.00 | 0.00 | 1.72 | 0.00 |
| Asphalt | 0.13 | 0.00 | 0.00 | 0.00 | 95.37 | 0.85 | 0.00 | 0.00 | 0.00 | 0.00 | 0.00 | 0.00 | 0.94 | 0.00 | 1.51 | 0.00 |
| Benelex/lead | 0.00 | 0.00 | 0.00 | 0.00 | 0.83 | 0.83 | 0.00 | 0.00 | 0.00 | 0.02 | 0.00 | 0.00 | 0.00 | 0.23 | 0.58 | 0.01 |
| Sheetrock | 0.00 | 0.00 | 0.00 | 0.00 | 0.15 | 0.15 | 0.00 | 0.00 | 0.00 | 0.81 | 0.00 | 0.00 | 0.00 | 0.04 | 0.11 | 0.06 |

TABLE 3-continued

Chemical composition of the inert fraction of feedstock material treatable by this invention expressed as a fraction of the inert chemicals.

Combustibles

*Plastics*

| | | | | | | | | | | | | | | | | |
|---|---|---|---|---|---|---|---|---|---|---|---|---|---|---|---|---|
| Poly | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| PVC | 0.00 | 6.20 | 0.00 | 0.00 | 0.20 | 0.00 | 0.00 | 0.00 | 0.00 | 0.00 | 0.00 | 0.00 | 6.20 | 0.00 | 0.00 | 0.00 |
| Teflon | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Plexiglas | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

*Rubber*

| | | | | | | | | | | | | | | | | |
|---|---|---|---|---|---|---|---|---|---|---|---|---|---|---|---|---|
| Rubber | 0.00 | 1.30 | 0.00 | 0.00 | 4.20 | 1.30 | 0.00 | 0.00 | 0.00 | 2.10 | 0.00 | 0.00 | 62.10 | 0.00 | 0.00 | 0.00 |
| Surgeon's glove | 0.00 | 1.30 | 0.00 | 0.00 | 4.20 | 1.30 | 0.00 | 0.00 | 0.00 | 2.10 | 0.00 | 0.00 | 62.10 | 0.00 | 0.00 | 0.00 |

*Misc. Combustibles*

| | | | | | | | | | | | | | | | | |
|---|---|---|---|---|---|---|---|---|---|---|---|---|---|---|---|---|
| Graphite | 0.00 | 0.00 | 2.30 | 0.00 | 45.50 | 0.80 | 0.00 | 0.00 | 0.00 | 1.60 | 0.00 | 0.00 | 0.00 | 8.10 | 0.00 | 0.00 |
| Paper | 0.00 | 0.00 | 0.00 | 0.00 | 16.88 | 16.80 | 0.00 | 0.00 | 0.00 | 0.39 | 0.00 | 0.00 | 0.00 | 4.62 | 11.69 | 0.13 |
| Wood | 0.00 | 0.00 | 0.00 | 0.00 | 16.88 | 16.80 | 0.00 | 0.00 | 0.00 | 0.39 | 0.00 | 0.00 | 0.00 | 4.62 | 11.69 | 0.13 |
| Cardboard | 0.00 | 0.00 | 0.00 | 0.00 | 16.88 | 16.80 | 0.00 | 0.00 | 0.00 | 0.39 | 0.00 | 0.00 | 0.00 | 4.62 | 11.69 | 0.13 |
| Cloth | 0.00 | 0.00 | 0.00 | 0.00 | 16.88 | 16.80 | 0.00 | 0.00 | 0.00 | 0.39 | 0.00 | 0.00 | 0.00 | 4.62 | 11.69 | 0.13 |

TABLE 4

Estimated compositions of the additives used to prepare the surrogate waste mixtures.

| Additive | Comp. |
|---|---|
| Lime | |
| CaO | 91.6 |
| $SiO_2$ | 0.34 |
| $CO_2$ | 0.82 |
| $Fe_2O_3$ | 0.46 |
| $Al_2O_3$ | 0.16 |
| MgO | 1.24 |
| $SO_3$ | 0.00 |
| $Ca_2O$ | 0.00 |
| HgO | 0.00 |
| $K_2O$ | 0.06 |
| SeO | 0.00 |
| $Ag_2O$ | 0.00 |
| CdO | 0.00 |
| $Na_2O$ | 0.03 |
| $P_2O_3$ | 0.03 |
| Cl | 0.00 |
| Pb | 0.00 |
| As | 0.00 |
| Water | 5.20 |
| Carbon steel | |
| Fe | 99.2 |
| C | 0.08 |
| P | 0.02 |
| S | 0.01 |
| Mn | 0.45 |
| Si | 0.25 |
| Stainless steel | |
| Fe | 70.5 |
| Cr | 18.1 |
| Ni | 8.68 |
| C | 0.10 |
| Zirconium | |
| Zr | 93.0 |
| Mo | 4.70 |
| Si | 1.50 |
| Fe | 0.40 |
| Cr | 0.30 |
| Hf | 0.10 |
| Cu | 0.09 |
| Mn | 0.09 |
| Copper | 100 |
| Lead | |
| Pb | 99.9 |
| Cu | 0.10 |
| Cadmium | 100 |
| Aluminum | |
| Al | 95.6 |
| Mg | 2.80 |
| Si | 1.60 |
| Lead oxide | |
| $Pb_2O_4$ | 98 |
| Mn | 0.00005 |
| Acid insol. matter | 0.03 |
| $H_2O$ insol. matter | 0.05 |
| Diatonite | |
| $A_2O$ | 0.00 |
| $Al_2O_3$ | 4.29 |
| $As_2O$ | 0.00 |
| BaO | 0.01 |
| CaO | 0.59 |
| CdO | 0.00 |
| $CeO_2$ | 0.00 |
| Cl | 0.02 |
| $CO_2$ | 0.00 |
| $Cr_2O_4$ | 0.00 |
| $Cs_2O$ | 0.00 |
| CuO | 0.00 |
| $Fe_2O_3$ | 2.09 |
| HgO | 0.00 |
| $K_2O$ | 0.35 |
| MgO | 0.28 |
| $Na_2O$ | 3.73 |
| NiO | 0.00 |
| $P_2O_5$ | 0.04 |
| PbO | 0.00 |
| SeO | 0.00 |
| $SiO_2$ | 86.21 |
| $SO_4$ | 0.05 |
| $TiO_2$ | 0.22 |
| ZnO | 0.00 |
| $ZrO_2$ | 0.01 |
| Water | 2.09 |

TABLE 4-continued

Estimated compositions of the additives used to prepare the surrogate waste mixtures.

| Additive | Comp. |
|---|---|
| Latex rubber stoppers | |
| C | 76.2 |
| H | 10.3 |
| O | 2.32 |
| N | 0.65 |
| S | 1.18 |
| $Al_2O_3$ | 0.09 |
| CaO | 1.93 |
| $Fe_2O_3$ | 0.09 |
| PbO | 0.01 |
| MgO | 0.58 |
| $P_2O_3$ | 0.12 |
| $SiO_2$ | 0.39 |
| $Na_2O$ | 0.12 |
| $TiO_2$ | 0.20 |
| ZnO | 5.80 |
| KOH | 100 |
| $HNO_3$ | 100 |
| Neoprene rubber | |
| C | 54.70 |
| H | 5.65 |
| Cl | 37.87 |
| N | 0.26 |
| S | 1.52 |
| PVC | |
| C | 44.4 |
| H | 5.57 |
| Cl | 49.6 |
| N | 0.005 |
| S | 0.39 |
| Portland Cement | |
| $SiO_2$ | 20.8 |
| $Al_2O_3$ | 6.56 |
| $Fe_2O_3$ | 2.76 |
| $SO_3$ | 1.63 |
| CaO | 59.8 |
| BgO | 2.41 |
| $CO_2$ | 1.03 |
| Water | 5.00 |
| Wood pellets (wood, paper, cloth) | |
| C | 34.5 |
| H | 6.54 |
| O | 48.9 |
| N | 0.09 |
| Water | 10.0 |
| Microcel E | |
| $Ag_2O$ | 0.00 |
| $Al_2O_3$ | 1.57 |
| $As_2O$ | 0.00 |
| BaO | 0.01 |
| CaO | 30.2 |
| CdO | 0.00 |
| $CeO_2$ | 0.01 |
| Cl | 0.00 |
| $CO_2$ | 2.28 |
| $Cr_2O_3$ | 0.01 |
| $Cs_2O$ | 0.00 |
| CuO | 0.00 |
| $Fe_2O_3$ | 1.27 |
| HgO | 0.00 |
| $K_2O$ | 0.25 |
| MgO | 0.78 |
| $Na_2O$ | 0.31 |
| NiO | 0.01 |
| $P_2O_3$ | 0.07 |
| PbO | 0.00 |
| SeO | 0.00 |
| $SiO_2$ | 49.4 |
| $SO_4$ | 0.15 |
| $TiO_2$ | 0.09 |
| ZnO | 0.01 |
| $ZrO_2$ | 0.00 |
| Water | 13.6 |
| Teflon | |
| C | 24.0 |
| F | 76.0 |
| Wheel bearing grease | |
| C | 82.5 |
| H | 12.2 |
| S | 1.36 |
| O | 3.77 |
| N | 0.14 |
| Vermiculite | |
| Al | 19.0 |
| Fe | 39.2 |
| Mg | 17.1 |
| Si | 19.7 |
| $H_2O$ | 5.00 |
| Soil | |
| $Ag_2O$ | 0.00 |
| $Al_2O_3$ | 12.04 |
| $As_2O$ | 0.00 |
| BaO | 0.12 |
| $CaCO_2$ | 9.08 |
| CaO | 0.24 |
| CdO | 0.00 |
| $CeO_2$ | 0.01 |
| $Cr_2O_{0.01}$ | 3 |
| $Cs_2O$ | 0.00 |
| CuO | 0.01 |
| $Fe_2O_4$ | 4.75 |
| HgO | 0.00 |
| $K_2O$ | 2.32 |
| MgO | 2.19 |
| $MnO_2$ | 0.11 |
| $Na_2O$ | 1.59 |
| NiO | 0.01 |
| $PO_4$ | 0.24 |
| PbO | 0.00 |
| $SO_4$ | 0.05 |
| SeO | 0.00 |
| $SiO_2$ | 61.40 |
| $TiO_2$ | 0.66 |
| ZnN | 0.02 |
| Cl | 0.00 |
| Water | 5.13 |
| Polyethylene | |
| C | 85.6 |
| H | 14.1 |
| O | 0.20 |
| N | 0.03 |
| S | 0.05 |
| $Al_2O_3$ | 0.00 |
| CaO | 0.00 |
| MgO | 0 |
| $Al(OG)_2$ | 100 |
| $Fe(OH)_3$ | 100 |
| $Ca(OH)_2$ | 100 |
| $Mg(OH)_2$ | 100 |
| NaOH | 100 |
| $NaNO_3$ | 100 |
| $Na_2SO_4$ | 100 |
| NaCl | 100 |
| Texaco Regal Oil | |
| C | 85.4 |
| H | 13.5 |

TABLE 4-continued

Estimated compositions of the additives used to prepare the surrogate waste mixtures.

| Additive | Comp. |
|---|---|
| S | 0.10 |
| O | 0.87 |
| N | 0.10 |

The present invention can process wastes to (a) reduce volume and solid mass by evaporating moisture, thermally decomposing carbonates, and pyrolyzing organics, (b) destroy hazardous and non-hazardous organics, (c) melt inorganic oxides to form a homogeneous, easy to characterize and dispose/recycle slag (glass ceramic rock-like waste form), (d) separate metals into a molten, tappable metal phase, and (e) decontaminate the metal phase from radionuclides (if present). The resultant products are very homogeneous and easy to characterize, compared to the variety of heterogeneous materials which can be fed to the melter. The melter chamber 4 can receive wastes that vary widely in physical and chemical content. The slag composition is inherently less variable owing to (a) less variability of the inorganic materials of many waste materials, and (b) mixing effects of varying inorganic feed in the molten slag pool. Occassionally, depending on the feed compositions, desired operating conditions, and slag or metal products, additives are used to modify the glass ceramic rock-like waste form or metal products.

Figure 1:
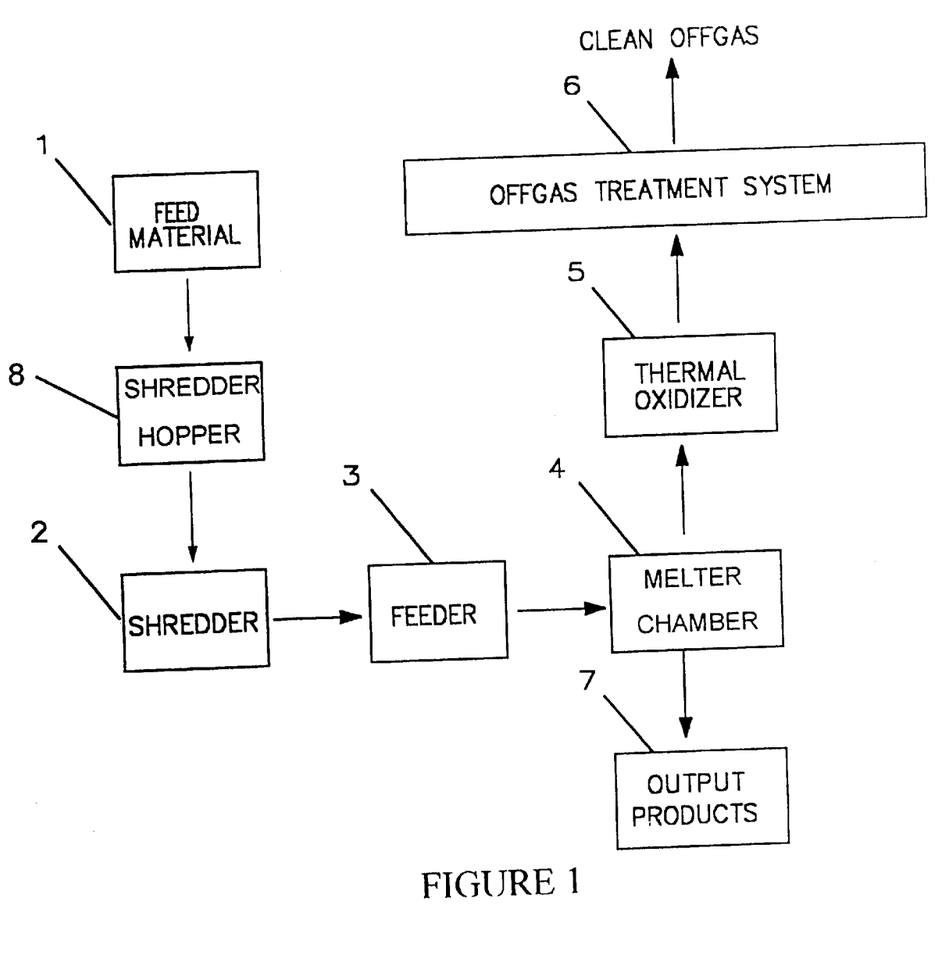
FIG. 1 schematically depicts a flow diagram for the process embodied by the present invention.

An example schematic of the process embodied by the present patent is shown in FIG. 1. The particle size of the feed material 1 can range from submicron-size up to one-half of the melter diameter. Feed materials and containers of feed materials are fed through a shredder hopper 8 and size-reduced in the waste handling and feeding system using a low-speed, high-torque shredder 2 This type of shredder, commercially available and included as a component of the present invention, can process most types of waste included heterogeneous combustibles, inorganics including bricks and concrete, and metals up to ¼-inch thick. The shredder 2 is capable of shredding the contents of waste containers and/or entire waste drums, boxes, and other containers.

The waste is shredded into a hopper which also serves as the feed hopper for a commercial feeder 3. The feeder 3 can reliably extrude or convey the shredded feed material (feedstock) through a feed port in the sidewall of the melter chamber 4.

A close-coupled thermal oxidizer 5 effectively oxidizes gaseous and entrained organics that evolve from the melt and feed materials. The offgas with entrained and volatilized particulate is cleansed and treated in an offgas treatment system 6 to control emissions. Output products 7 consisting of a metal form and a glass ceramic form are removed and processed into value added products.

The present invention can process waste liquids, sludges, slurries, or gases. Liquids, sludges, and slurries can be fed into the melter through injectors or nozzles, absorbed into the dry sorbents, or delivered in small, intact containers. The present invention is also capable of processing a feedstock 11 containing radioactive isotopes emitting alpha, beta, or gamma radiation.

The present invention can meet or surpass the Resource Conservation and Recovery Act (RCRA) best demonstrated available technology (BDAT) treatment requirements for essentially any hazardous organic contaminants, and can produce a very leach-resistant glass ceramic rock-like waste form or value-added product that can immobilize oxidizes of toxic metals and radionuclides in compliance with regulatory limits.

Figure 2:
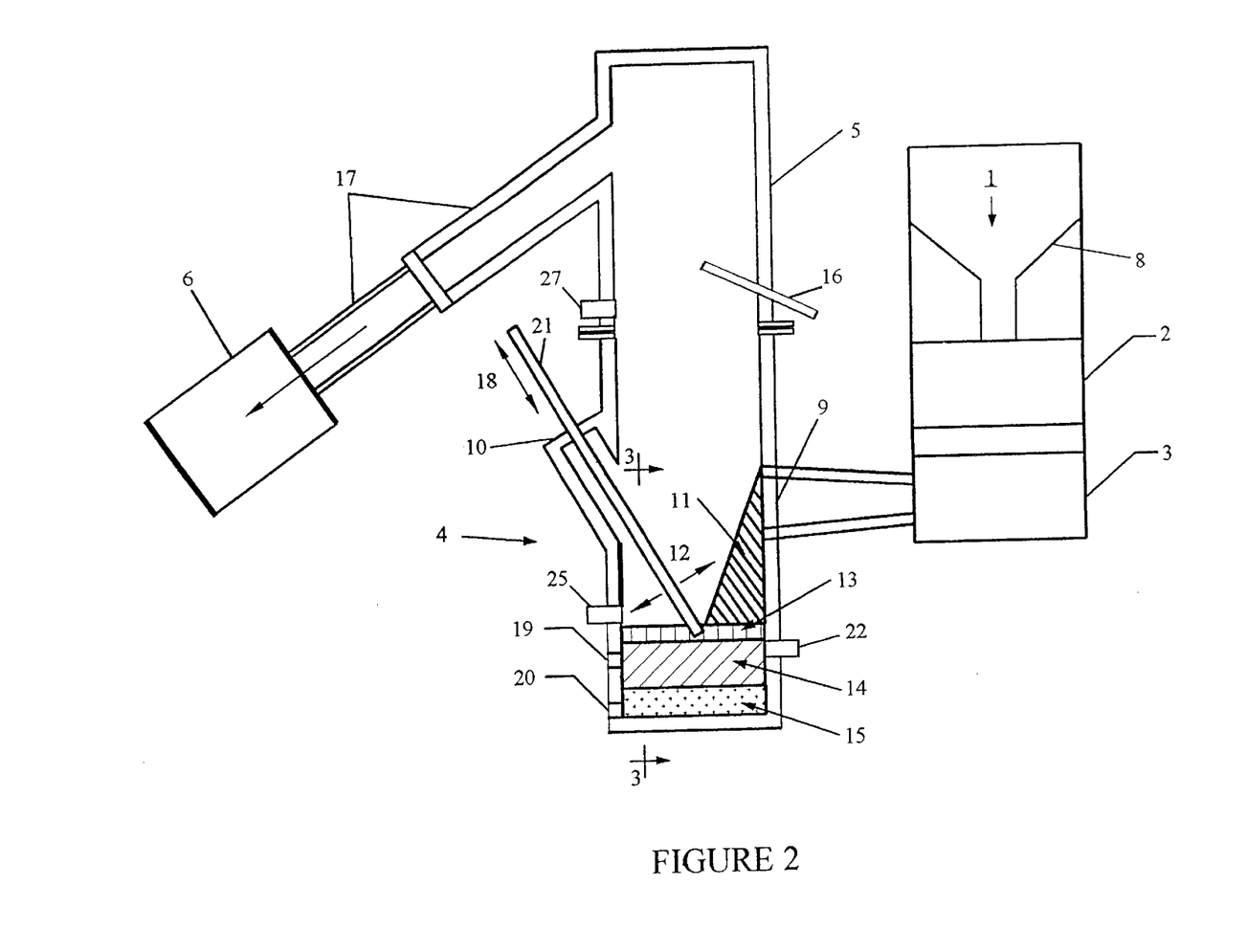
FIG. 2 depicts a representation of the system apparatus for thermal processing of heterogeneous feedstock and the production of a metal product, a glass ceramic product, and a gaseous product according to this invention.
Figure 3:
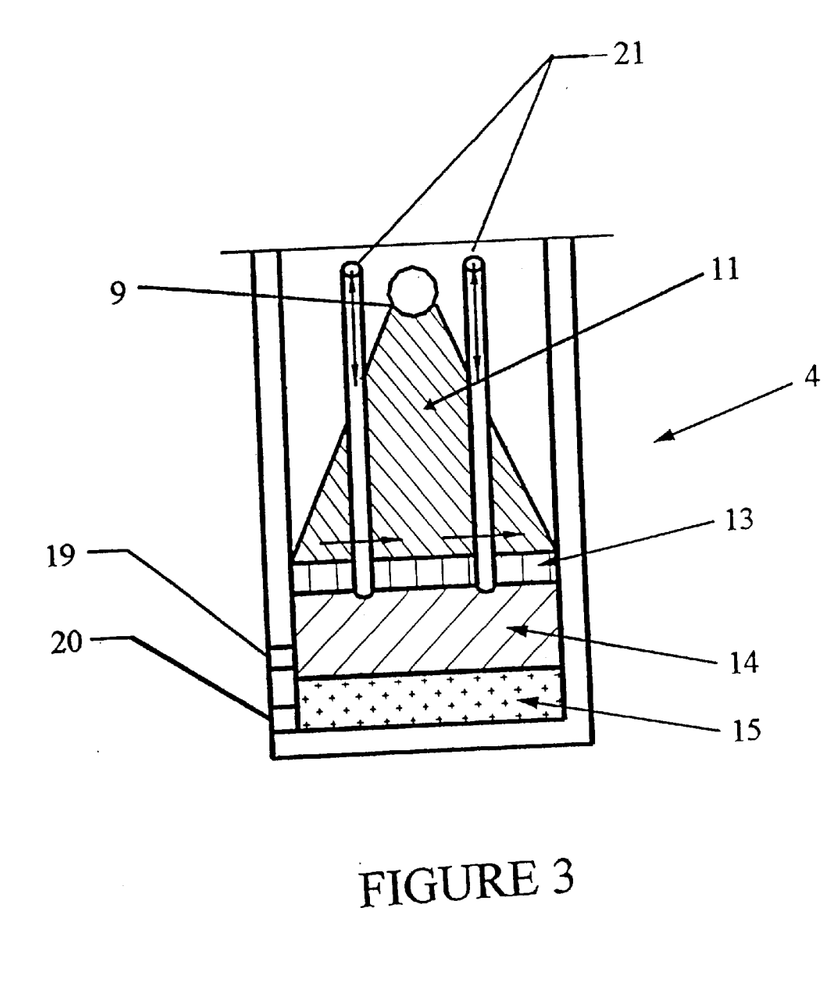
FIG. 3 depicts the preferred primary heat source supply according to this invention.
Figure 4:
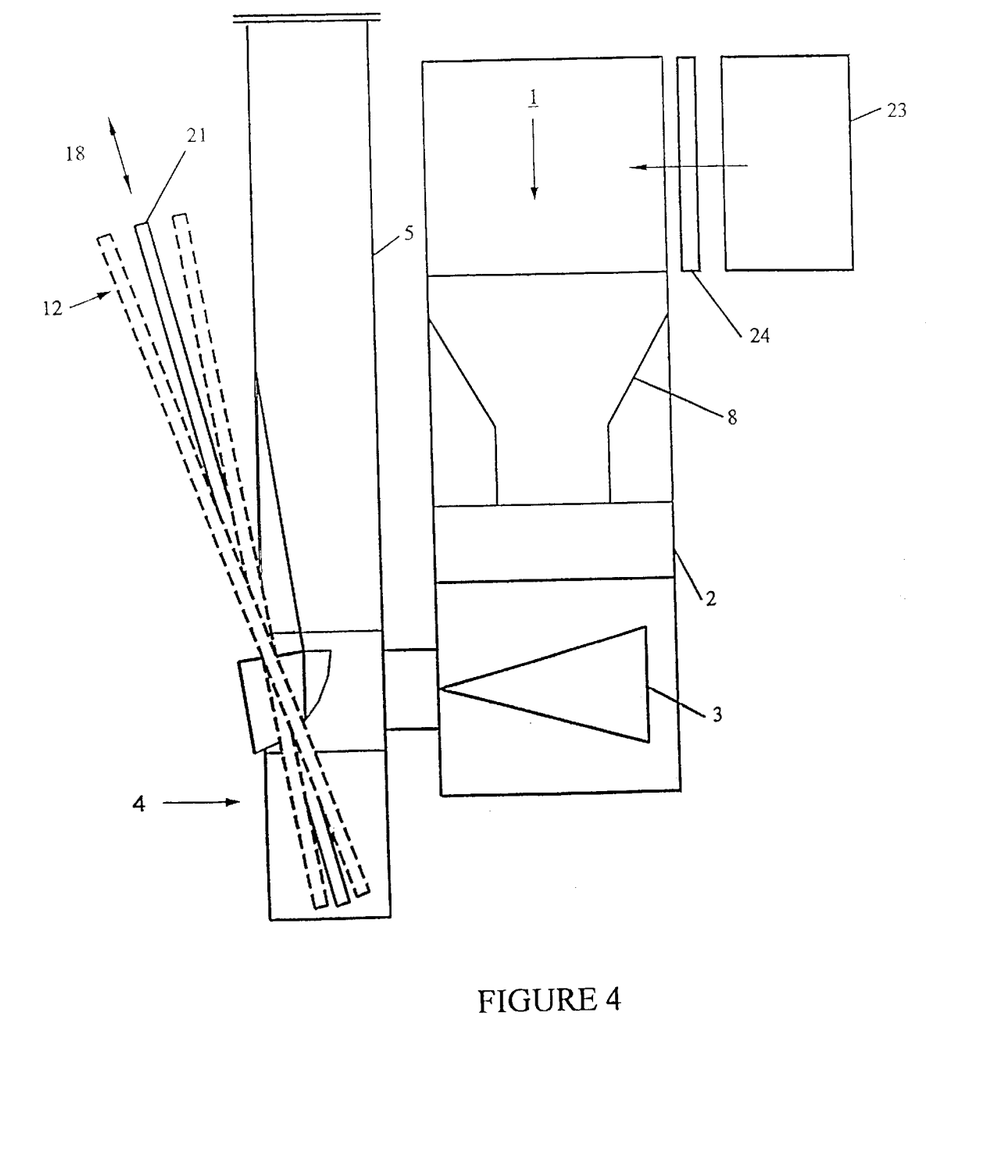
FIG. 4 depicts a representation of the system apparatus for thermal processing of heterogeneous feedstock and the production of a metal product, a glass ceramic product, and a gaseous product for the treatment of radioactive or hazardous wastes according to this invention.

A more detailed illustration of the present invention process and apparatus is shown in FIGUREs 2, 3, and 4. Processes that occur in the melter chamber 4 include rapid heat transfer, chemical reactions, and physical transformations from solids to liquids and gases. Feedstock 11 that enters the melter chamber 4 is heated and absorbed into the melt through a cold cap 13 due to (a) radiant heat transfer from the arc and the melt pool, (b) conductive and convective heat transfer and mixing in the melt pool, and (c) resistance heating (joule heating) in the melt. As the feedstock heats up, (a) moisture and water of hydration evaporate, (b) organics, nitrates, carbonates, sulfates, and other materials thermally decompose, pyrolize, and oxidize to form primarily gases and oxides that are soluble in the melt, (c) inorganics melt into the molten slag 14, and (d) metals in the feedstock 11 either oxidize when there is sufficient oxygen available from solid or gaseous oxidants and combine with the slag 14 or melt and sink through the slag, due to a greater metal density and form a metal pool 15. Some elements such as plutonium are highly oxidizable, but very non-volatile, and will tend to concentrate in the molten slag 14, as desired, leaving the offgas and metal products with reduced contamination. Volatile species like chlorides, sulfates, and some metals (such as mercury, lead, cadmium, and arsenic) partially or more completely volatilize. This can enable concentration of these species in the offgas for cleansing, if desired, or the present invention's operating conditions can be adjusted to more effectively retain some of these species in the melt by creating a continuously consumable filter (cold cap) 13 thereby increasing the residence time of a volatile material in the melt for increased chemical reactions and incorporation into the slag. The surface of the molten pool is regulated with a controlled depth of cold cap 13 to enhance the partitioning of volatile material to the molten glass ceramic phase.

The melter chamber 4 can be operated with a cooled exterior wall/bottom to freeze a layer of molten product on the sidewall/bottom for the safe long term operation of the melter. The refractory-lined melter chamber 4 is comprised of an electrode port 10 at 30 degrees ±10 degrees from vertical, a feed port 9 at 90 degrees from vertical, and a central offgas port vertically above the melter chamber (e.g. closely above). In this present invention, oxygen is injected into the molten pool through an oxygen port 22 or near the surface of the molten pool through an oxygen port 25 for control of oxidation reduction reactions in and above the molten pool.

A contiguous thermal oxidizer 5 sufficiently large to provide a gaseous residence time greater than two seconds in located vertically above the melter chamber 4. In the present invention, an auxiliary heat source 16 is injected into the base of the thermal oxidizer 5 to maintain an operating temperature of 1,800° F. to 2,200° F. In addition, oxygen enriched air is injected through an oxygen port 27 into the base of the thermal oxidizer 5 to help maintain the desired temperature and provide additional oxygen for oxidation reactions. Other operating conditions can be varied to optimize or reduce the amount of metal 15 product or change the slag 14 chemistry.

The present invention includes a tapping and casting system which can be operated in such a manner as to control the cooling rate of the cast molten glass-ceramic by means of a mold insulation or the addition of heat for the purpose of controlling the amorphous/crystalline phase structure of the final cooled product. The present invention incorporates a refractory-lined melter chamber 4 with a melt pool 14, 15 having a nominal depth to diameter ratio ranging from one quarter to one-half and includes multiple side outlets for tapping molten metal and slag. A slag port 19 is located at a depth from the desired melt surface equal to one half the melt radius and a metal port 20 is located at the bottom of the melt zone to allow for intermittent or continuous tapping of either materials. Alternatively a portion of the melt chamber 4 containing the molten products can be readily removable as in a batch operation without any tapping capability or need.

The offgas with entrained and volatilized particulate is cleansed and treated in an offgas treatment system 6 to efficiently control emissions of organics, particulate, acid gases, toxic metals, or other undesired emissions. In the present invention the cleansed particulate, volatile metals, salts and air pollution control system maintenance material such as filters can be introduced back into the feed material 1 and processed through the system again. The unique, close-coupled thermal oxidizer 5 is designed to efficiently oxidize gaseous and entrained organics that evolve from the melt and feet materials. The thermal oxidizer 5 is designed specifically to perform oxidation of gas which contains large amounts of entrained particulate without problematic particulate slagging or fouling by close coupling the thermal oxidizer 5 vertically to the melter chamber 4. This capability is very important for hazardous and radioactive waste treatment, when worker access for maintenance is limited or prevented. A unique arrangement of an offgas quench chamber 17 to the thermal oxidizer 5 enables near instantaneous reduction of gas temperature from greater than 2000° F. to less than 150° F. in a minimum space. The offgas quench chamber 17 is directly coupled to the top of the contiguous thermal oxidizer 5 extending downward at 45–60 degrees from horizontal. The quench chamber 17 to thermal oxidizer 5 configuration reduces the potential for offgas duct plugging common in horizontal crossover duct arrangements and also minimizes the potential for dioxin formation due to the very short gas residence time in the dioxin formation/ synthesis temperature range (around 450° F.–750° F.).

An alternative option included in the present invention is to produce a synthesis gas or low-Btu fuel gas from the melter offgas. The oxidation reduction reactions of the gaseous phase can be regulated and controlled to maximize the generation of a syngas for process feedstocks or fuel gas for cogeneration. In this option, the thermal oxidizer 5 is replaced with a reaction chamber 5 that allows the addition of steam or other reagents to react with the melter offgas to form hydrogen, carbon monoxide, methane gas, or other gases. Particulate in the offgas is filtered either upstream or downstream of the reaction chamber 5.

The present invention has an offgas treatment system 6 with particulate and acid gas removal options that include (a) wet particulate and acid gas removal, followed by reheating and removal of trace organics, trace toxic metals, and trace submicron particulate, or (b) dry particulate removal in a baghouse or high temperature filter, followed by wet acid gas removal, gas reheating, and removal of trace organics, trace toxic metal, and trace submicron particulate. Heat recovery through gas-to-air heat exchange, water heating, or steam generation are additional options.

The wet-dry offgas treatment system 6 is designed specifically for radioactive waste applications, and is very reliable and compact. A single secondary waste stream consisting of scrubber liquor blowdown is produced, with much smaller amounts of recyclable, spent HEPA filters, and possibly spent charcoal absorbers or other trace organics and metals absorbers. The scrubber liquour contains dissolved salts of any absorbed chloride, sulfate, and fluoride acid gases, other dissolved species absorbed from the offgas such as nitric acid and carbonic acid, and suspended undissolved particulate solids.

The dry-wet offgas treatment system 6 is designed to enable automatic separation of a dry particulate secondary waste stream separately from a wet scrubber aqueous blowdown. This is desired if the particulate can be (a) used as a value added product such as a feedstock for metals recovery operations, (b) recycled to the melter, or (c) stabilized in processes that do not readily tolerate chlorides or other scrubber species. Filtration of the particulate separately from acid gas scrubbing reduces the amounts, if any, of chlorides that are not desired in downstream particulate processing or recycling.

Other offgas treatment systems 6 that may also be incorporated based on regulatory or other requirements include dry or semi-dry scrubbing for acid gas control, followed by dry particulate filtration.

The present invention uses a direct current electricity-based heat source comprising of two axial translating (as at arrow 18) graphite electrodes 21 penetrating at an angle to the axis of the melter chamber 4. Two alternatives for current and voltage-conveying systems are alternating single-phase graphite electrodes 21 in multiples of two and alternating three-phase graphite electrodes 21 in multiples of three. The graphite electrodes 21 are located with the nominal tip spacing of one half the molten pool diameter and can be operated in either an immersed short arc joule heating resistance mode or a long arc radiant heating mode. The graphite electrode 21 are equipped with translating mechanisms capable of positioning the electrode tips in the x, y, and z directions 12. The graphite electrodes 21 tips can be adjusted separately to account for a changing melt surface level of electrode consumption rate. For example, the arc melter electrode tips can be raised in conjunction with a rise of the surface of the molten pool in a portion of the melter chamber having a nominal depth to diameter ratio of less than one-half. The melter chamber is then readily removable as in a batch operation without any need for a tapping capability.

This invention has benefits for the industrial thermal partitioning (processing) of heterogeneous feedstock. The invention process and apparatus extend to the treatment of industrial hazardous wastes, medical wastes, and radioactive (mixed) wastes. The invention can also extend to the thermal treatment of municipal solid wastes or sludges.

The output products 7 (FIG. 1) are a metal form suitable for recycling, a glass ceramic form stable in nature with high leach resistance, a fully combusted offgas form suitable for final cleansing, or a fuel-rich gaseous form suitable for process feedstocks or cogeneration. An additional advantage from the production of solid products is a significant volume reduction compared to the input feedstock.

Referring exclusively to FIG. 4, when radioactive or hazardous material is processed an additional isolation gate 24 and air lock 23 is added to the shredder hopper 8 to ensure complete containment.

From the foregoing description, it will thus be evident that the present invention provides a design for process and apparatus for the partitioning and thermal treatment of heterogeneous feedstock. Various changes can be made in the above embodiments and operating methods without departing from the spirit or scope of the following claims. It is intended that all matter contained in the above description or shown in the accompanying drawings should be interpreted as illustrative and not in a limiting sense.

Variations or modifications to the design and construction of this invention, within the scope of the appended claims, may occur to those skilled in the art upon reviewing the disclosure herein (especially to those using computer aided design systems). Such variations or modifications, if within the spirit of this invention, are intended to be encompassed within the scope of any claims to patent protection issuing upon this invention.

I claim:

1. A process wherein a homogeneous or heterogeneous feedstock is thermally treated to form a molten pool and a gaseous phase in partitioning arc melter comprising:
    a. shredding a feed material to produce a feedstock having a particle size from submicron to less than one half the melter diameter;
    b. conveying the feedstock directly into a melter chamber after said shredding;
    c. partitioning the feedstock into molten metal, slag, and offgas phases;
    d. oxidizing the offgas for greater than two seconds at a temperature above 2000° F. in a thermal oxidizer;
    e. quenching the offgas flow from the thermal oxidizer in an offgas fast quench chamber from a temperature above 2000° F. to a temperature less than 150° F. in a minimal time; and
    f. cleansing the offgas.

2. The process as in claim 1 wherein the nominal feedstock characterization is heterogeneous and the general chemical composition of the matrix material feedstock varies between ranges of: soils 0–100%, metals 0–35%, combustibles 0–90%, volatile organics 0–60%, chlorinated organics 0–60%, chlorine 0–20%, carbon 0–40%, nitrates 0–20%, and hydroxides 0–100%.

3. The process as in claim 1 wherein the feedstock contains organic and non-organic compounds and metals classified as hazardous or toxic according to a US Environmental Protection Agency classification.

4. The process as in claim 1 wherein the feedstock contains radioactive isotopes emitting alpha, beta, or gamma radiation.

5. The process as in claim 1 wherein said conveying further comprises conveying or extruding the feedstock through a sidewall of the melter.

6. The process as in claim 1, further comprising regulating a surface of the molten pool by controlling a depth of a cold cap to enhance the partitioning of volatile materials to a molten glass ceramic phase.

7. The process as in claim 1, further comprising cooling at least a portion of an exterior wall or bottom of the melter chamber to freeze a layer of molten product on at least a portion of an interior wall or bottom of the melter chamber, for safe long term operation of the melter.

8. The process as in claim 1 wherein said partitioning comprises heating by arc melter electrode tips.

9. The process as in claim 1, further comprising injecting oxygen into or near a surface of the molten pool for control of oxidation reduction reactions in and above the molten pool.

10. The process as in claim 1, further comprising injecting heat, by an auxiliary heat source, a base portion of the thermal oxidizer to maintain a predetermined operating temperature.

11. The process as in claim 1, further comprising injecting oxygen enriched air into a base portion of the thermal oxidizer to maintain a predetermined operating temperature and provide oxygen for oxidation reactions.

12. The process as in claim 1, further comprising introducing cleansed particulate, volatile metals, and salts obtained from said oxidizing, quenching and cleansing, back into the feed material and repeating the process of claim 1.

13. The process as in claim 1 further comprising introducing air pollution control system maintenance material back into the feed material and repeating the process of claim 1.

14. The process as in claim 1, further comprising removing final molten products from said melter chamber.

15. The process of claim 1, further comprising absorbing waste into the feed material or feedstock prior to said conveying the feedstock into the melter chamber.

16. The process as in claim 8, further comprising raising the arc melter electrode tips in conjunction with a rise of a surface of the molten pool.

17. The process as in claim 16, further comprising removing the melter chamber to obtain final molten products therein without the need for tapping capability.

18. The process of claim 1, further comprising injecting liquid waste onto a top of a cold cap or molten pool surface in the melter chamber.

19. A process wherein a homogeneous or heterogeneous feedstock is thermally treated to form a molten pool and a gaseous phase in a partitioning arc melter comprising:
    conveying the feedstock into the melter chamber;
    partitioning the feedstock into molten metal, slag, and offgas phases;
    contiguously oxidizing the offgas to a temperature above 2000° F. in a chamber close-coupled contiguously to the melter chamber; and
    fast quenching the offgas flow from the close-coupled chamber from a temperature above 2000° F. to a temperature less than 150° F. in a minimal time.

20. The process as in claim 19, further comprising adding steam or other reagents in said close-coupled chamber to react with the offgas to generate syngas or fuel gas.

21. The process as in claim 19, further comprising injecting heat, by an auxiliary heat source, into a base portion of the close-coupled chamber to maintain a predetermined operating temperature.

22. The process as in claim 19, further comprising injecting oxygen enriched air into a base portion of the close-coupled chamber to maintain a predetermined operating temperature and provide oxygen for oxidation reactions.

23. The process as in claim 19, wherein the close-coupled chamber is close-coupled vertically of and contiguous with the melter chamber.

24. The process as in claim 19, further comprising shredding a feed material, directly prior to said conveying, to produce the feedstock to have a particle size from submicron to less than one half the melter diameter; and wherein said conveying comprises conveying the feedstock horizontally through a side wall of said melter chamber.

25. The process in claim 19, wherein said fast quenching comprises quenching in a quench chamber directly coupled to a top of the close-coupled chamber.

26. The process in claim 25, wherein said fast quenching comprises directing a flow of the offgas downwardly from a top of the close-coupled chamber at an angle of about 45 to 60 degrees to horizontal.

27. The process as in claim 19, further comprising cleansing the offgas.

28. The process as in claim 19, further comprising removing final molten products from said melter chamber.

29. The process as in claim 19, further comprising heating said feedstock in said melter chamber using a direct current electricity-based heat source.

30. The process as in claim 29, wherein said heating comprises penetrating two graphite electrodes into the melter chamber at an angle to a vertical axis of the melter chamber.

31. The process wherein a homogeneous or heterogeneous feedstock is thermally treated to form a molten pool and a gaseous phase in a partitioning arc melter comprising:

conveying the feedstock into the melter chamber;

melting the feedstock into molten metal, slag, and offgas phases using a direct current electricity-based heat source;

oxidizing the offgas for greater than two seconds at a temperature above 2000° F.; and quenching the offgas flow in an offgas fast quench chamber from a temperature above 2000° F. to a temperature less than 150° F. in a minimal time.

32. The process as in claim 31, further comprising cleansing the offgas.

33. The process as in claim 31, further comprising removing final molten products from the melter chamber.

* * * * *